United States Patent [19]
Davis

[11] Patent Number: 5,058,999
[45] Date of Patent: * Oct. 22, 1991

[54] LIQUID CRYSTAL DEVICE HAVING DISTINGUISHING MEANS

[76] Inventor: Frederick Davis, 1253 Arlington Rd., Livermore, Calif. 94550

[*] Notice: The portion of the term of this patent subsequent to Aug. 28, 2007 has been disclaimed.

[21] Appl. No.: 384,252

[22] Filed: Jul. 24, 1989

Related U.S. Application Data

[63] Continuation-in-part of Ser. No. 72,360, Jul. 18, 1987, Pat. No. 4,952,033.

[51] Int. Cl.$^5$ .............................................. G02F 1/13
[52] U.S. Cl. .................. 359/43; 128/600.02; 359/53; 359/74
[58] Field of Search ................ 350/335, 351, 331 T, 350/334; 340/786, 713; 128/399, 403, 660.02

[56] References Cited

U.S. PATENT DOCUMENTS

| | | | |
|---|---|---|---|
| 3,619,254 | 11/1971 | Davis | 117/72 |
| 3,704,625 | 12/1972 | Seto et al. | 73/356 |
| 3,830,224 | 8/1974 | Vanzetti et al. | 128/2 H |
| 3,861,213 | 1/1975 | Parker | 73/356 |
| 3,951,133 | 4/1976 | Reese | 350/351 X |
| 4,022,706 | 5/1977 | Davis | 252/299 |
| 4,138,889 | 2/1979 | Fraschini | 73/356 |
| 4,433,637 | 2/1984 | Buirley et al. | 116/207 |
| 4,435,047 | 3/1984 | Fergason | 350/334 |
| 4,448,823 | 5/1984 | Clifford | 350/351 X |
| 4,741,859 | 5/1988 | McDonnell et al. | 252/299.63 |
| 4,834,500 | 5/1989 | Hilsum et al. | 350/351 X |
| 4,952,033 | 8/1990 | Davis | 350/351 |

Primary Examiner—Stanley D. Miller
Assistant Examiner—Huy K. Mai
Attorney, Agent, or Firm—Renner, Otto, Boiselle & Sklar

[57] ABSTRACT

A liquid crystal device (10) includes at least two layers of encapsulated thermochromic, e.g., liquid crystal, material (14, 16) for providing a color response with respect to temperature, the temperature ranges of color response of the at least two liquid crystal layers being different, a mechanism (18) in the form of a particular pattern of thermochromic material and/or separate pattern device for distinguishing the temperature range in which the device is operational, and a support (20) for supporting the at least two liquid crystal layers and distinguishing mechanism for positioning with respect to a part.

14 Claims, 1 Drawing Sheet

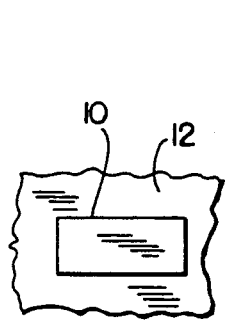
FIG. 1
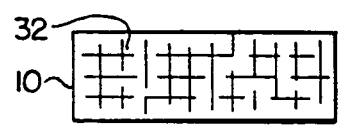
FIG. 2
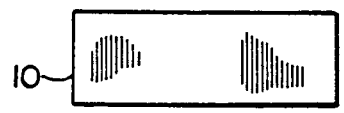
FIG. 3
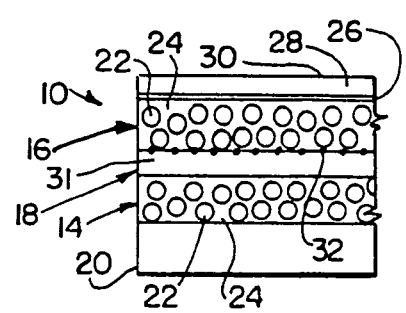
FIG. 4
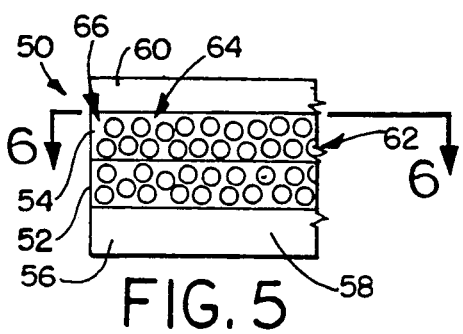
FIG. 5
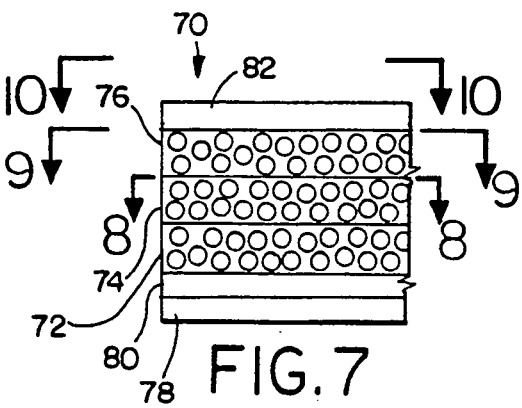
FIG. 7
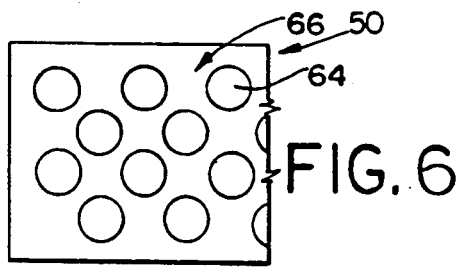
FIG. 6
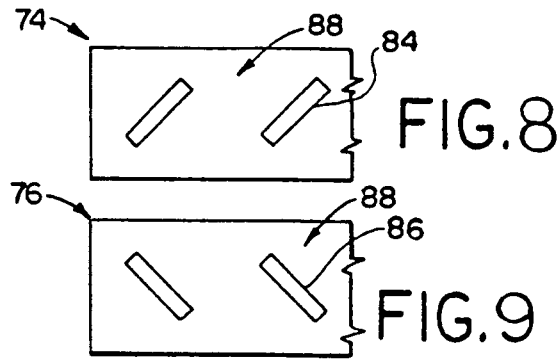
FIG. 8
FIG. 9
FIG. 10
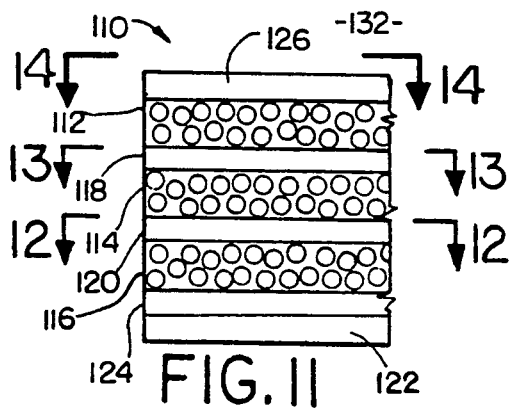
FIG. 11
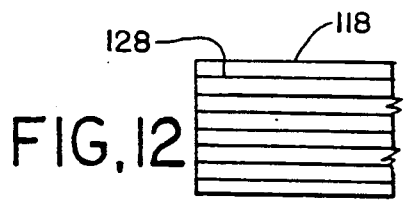
FIG. 12
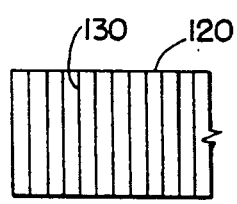
FIG. 13
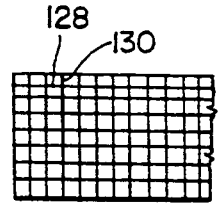
FIG. 14

LIQUID CRYSTAL DEVICE HAVING DISTINGUISHING MEANS

CROSS REFERENCE TO RELATED PATENT APPLICATION

This is a continuation-in-part of applicant's copending U.S. patent application Ser. No. 072,360, filed July 18, 1987, now U.S. Pat. No. 4,952,033 entitled "Liquid Crystal Medical Device," the entire disclosure of which is incorporated by reference. Such application discloses a device similar to that of the present invention directed to medical use.

TECHNICAL FIELD

This invention relates generally, as indicated, to optical devices having multiple temperature ranges of operation, to methods for making and using such devices, and, more particularly, to such optical devices and methods for identifying or indicating relative temperatures or for responding to temperature to identify multiple events. Even more particularly, the invention relates to such devices and methods using thermochromic devices and materials, and most preferably liquid crystal devices and materials.

BACKGROUND

Reference is made to U.S. Pat. No. 3,619,254 (Davis), which is directed to thermometric articles and methods for preparing same. Such patent describes an article in which a cholesteric liquid crystal material is supported on a substrate; the cholesteric liquid crystal material provides a color response as a function of temperature thereof. The cholesteric liquid crystal material scatters white light to give respective colors as a function of the temperature of the liquid crystal material. U.S. Pat. No. 4,022,706 (Davis) is another example of a disclosure of use of cholesteric liquid crystal material that provides a color response as a function of temperature. Specific formulations are described therein. The disclosures of such patents hereby are incorporated by reference.

In the past liquid crystal devices have been used for identifying the temperature of a device, a part, an environment, and even the human body, the latter sometimes referred to as thermal mapping of the body. Such identification has been accomplished using liquid crystal material that provides a color response such that different colors represent different respective temperatures. For example, a device containing the liquid crystal material would be held in intimate engagement with a part being examined. After temperature stabilization such that the temperatures of various areas of the device would be representative of the temperatures of the immediately underlying surface of such part, the color(s) presented by the respective areas of the device would indicate the relative temperature(s) of the part.

Importantly, the ability to detect relative temperature of the body may be used as a tool to detect possible medical problems. For example, liquid crystal devices to which the present invention relates have been used in the past as a tool to detect possible cancer, for the temperature of unhealthy tissue frequently is different from the temperature of healthy tissue. The present invention may be used for breast thermography, for example, to detect breast cancer or other possible problems regarding the breast(s) by providing an optical means, preferably by color, to make a comparison of the temperatures associated with the tissue of both breasts simultaneously. Ordinarily the temperature patterns of both breasts should be approximately symmetrical. A noticeable difference between the temperature patterns of both breasts may indicate the possibility of a problem. As will be apparent from the description herein, the present invention may be used for such medical and for other medical purposes when temperature information is desired.

The ability to detect the temperature of various devices, parts, etc. also is particularly useful to indicate overheat, near overheat, too cold, correct, etc. conditions. For example, if a motor were too hot, burn out is possible; and it would be desirable to indicate the hot condition so the motor could be shut down before damage occurs.

Liquid crystal thermometers are known. In one such thermometer device a particular number becomes visible to indicate that the thermometer is at such temperature. Reference is made, for example, to Seto et al. U.S. Pat. No. 3,704,625 and to Parker U.S. Pat. No. 3,861,213.

A difficulty encountered in the above-mentioned and in various liquid crystal temperature indicating devices, has been the limited number of colors in which the liquid crystal material can respond and/or the particular temperature range within which such colors must respond to indicate respective temperature. A corollary difficulty relates to the trade-off needed between accuracy of temperature indication and operational range. Increasing accuracy reduces range because the several colors are needed precisely to indicate relatively close temperatures. Increasing range, then, would reduce accuracy. To accomodate such difficulty, in the past several liquid crystal devices, each having a different temperature range had to be used sequentially until an accurate indication of temperature is achieved. Alternatively, a multiple event device, say two events, having two superimposed layers of temperature responsive color producing liquid crystal material has been used. Each liquid crystal material would have a color response in a different respective temperature range. The liquid crystal material may be transparent and uncolored when the temperature thereof is outside the respective temperature range at which color response is provided. The problem encountered using such multiple event detection device has been the difficulty in determining which of the liquid crystal materials is in its color response operational temperature range.

BRIEF SUMMARY OF THE INVENTION

With the foregoing in mind, one aspect of the present invention is directed to an optical device including at least two optical means for providing an optical response with respect to temperature, the temperature ranges of optical response of said at least two optical means being different, distinguishing means for distinguishing the temperature range in which the device is operational, and support means for supporting said at least two optical means and distinguishing means for positioning with respect to a source of temperature to which the device may be responsive. More preferably, according to this and other aspects of the invention, the optical means and/or devices use thermochromic material and most preferably use liquid crystal material.

Accordingly, an aspect of the invention is to provide for the detection of multiple events, such as different temperatures or temperature ranges and, more particularly, to provide an optical response indicative of those events, especially using serially positioned thermochromic, especially liquid crystal, devices.

According to an additional aspect the optical response mentioned above is a color response; and other aspects further include using one or more pattern devices and/or patterned liquid crystal material(s) as the distinguishing means.

Another aspect relates to a method of making an optical device, e.g., thermochromic and/or liquid crystal, including making at least two thermochromic means for providing an optical response with respect to temperature by mixing respective temperature responsive thermochromic materials with a binder, the temperature ranges of optical response of said at least two thermochromic means being different, applying such thermochromic means in superimposed position for support by a support means capable of positioning with respect to a source of temperature to respond to the same, such as a part, body, machine, heat source, etc., and applying distinguishing means for distinguishing the temperature range in which the device is operational or operating.

Other aspects of the method and article/apparatus of the invention relate to using liquid crystal to provide color response as such optical response, and applying such distinguishing means as one or more separate patterns and/or as pattern(s) of liquid crystal or other thermochromic material(s). The distinguishing means may be used, for example, to provide useful output information and/or to provide a decorative output.

A further aspect relates to a method of detecting the temperature of something, such as a device, part, body, etc. (all used generally interchangeably herein) including applying in thermal transfer relation with respect to a part a liquid crystal device having plural thermochromic means, most preferably liquid crystal means, for providing respective optical responses as a function of temperature, the temperature ranges of optical response of said at least two thermochromic means being different, and distinguishing the temperature range in which the device is operational by viewing means positioned relative to said thermochromic means and partly viewable depending on the temperature range of such thermochromic means.

Other aspects of the above method relate to providing color response as such optical response, and distinguishing temperature range using one or more separate patterns and/or as pattern(s) of thermochromic or liquid crystal material(s).

As used herein, the term thermochromic, thermochromic means, or thermochromic device is intended to define a material or device that produces an optical output in response to temperature or temperature changes; such optical output preferably is a color output or a change in color with respect to temperature, but also such optical output or response may include black, white and/or clear/transparent. A liquid crystal material can be an example of a thermochromic material. The terms thermochromic and liquid crystal material (that operates to produce an optical output with respect to temperature) may be used equivalently and interchangeably herein, as will be appreciated from the context.

These and other features, objects, aspects, embodiments and advantages of the present invention will become more apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

It will be appreciated that the claims are intended to cover not only the particular means, elements and inventions set forth therein, but also equivalent means, elements and inventions.

BRIEF DESCRIPTION OF THE DRAWINGS

In the annexed drawings,

FIG. 1 is a schematic view of a thermochromic temperature sensitive device according to the invention positioned relative to a test part to indicate temperature information thereof;

FIG. 2 is a schematic illustration of the liquid crystal device of FIG. 1 in the second of two temperature ranges with the distinguishing grid pattern seen;

FIG. 3 is a view similar to FIG. 2 but in the first temperature range with the distinguishing grid pattern no longer visible;

FIG. 4 is a schematic elevation view showing a cross section of the layers of one embodiment of the invention using a distinguishing grid pattern, such as those depicted in FIGS. 1-3;

FIG. 5 is a schematic elevation view showing a cross section of the layers of another embodiment of the invention using a distinguishing pattern formed by the lower layer (first layer) of liquid crystal material;

FIG. 6 is a schematic plan view showing the plural circles patterned arrangement of encapsulated liquid crystal material in the first liquid crystal layer looking in the direction of the arrows 6—6 of FIG. 5;

FIG. 7 is a schematic elevation view of another embodiment of invention using three liquid crystal layers, two of which are laid down in different but cooperative patterns for temperature range distinguishing;

FIG. 8 is a schematic plan view showing the pattern of the second liquid crystal layer of the device of FIG. 7 including plural sloping lines from upper right down to lower left, looking generally in the direction of the arrows 8—8 of FIG. 7;

FIG. 9 is a schematic plan view showing the pattern of the third liquid crystal layer of the device of FIG. 7 including plural sloping lines from upper left down to lower right, looking generally in the direction of the arrows 9—9 of FIG. 7;

FIG. 10 is a composite view of the device of FIG. 7 looking down toward all three liquid crystal layers with a cross-like pattern formed by the patterns of both the second and third liquid crystal layers being seen;

FIG. 11 is a schematic elevation view of still another embodiment of invention using three liquid crystal layers and two separate grid distinguishing layers, each grid being formed of a series of lines so as to be cooperative to form a crossed grid when both are viewed and only parallel lines when only one is viewed;

FIG. 12 is a schematic plan view showing the pattern of the first grid of the device of FIG. 11 looking generally in the direction of the arrows 12—12 of FIG. 11;

FIG. 13 is a schematic plan view showing the pattern of the second grid of the device of FIG. 11 looking generally in the direction of the arrows 13—13 of FIG. 11; and FIG. 14 is a composite view of the device of FIG. 11 looking down through the second and third transparent liquid crystal layers while the first liquid crystal layer is not transparent, whereby a crossed line pattern formed by the patterns of both the first and second grids is seen.

DESCRIPTION OF THE PREFERRED EMBODIMENTS

Referring, now, in detail to the drawings, wherein like reference numerals designate like parts in the several figures, and initially to FIG. 1, a liquid crystal indicator device for temperature, diagnostic, or indicating purposes is designated 10. The device 10 is shown positioned relative to a test part 12, such as the case or housing of a motor or engine. The device 10 also may be used with other parts. The purpose of the device 10 is to provide an indication of the temperature of the part or the like with respect to which it is positioned.

Throughout the following description the device 10 and other devices according to the invention are described in detail as liquid crystal devices using liquid crystal material to provide optical response relative to temperature. Liquid crystal material is one form of thermochromic material used according to the invention. It will be understood and appreciated that other types of thermochromic materials also may be used equivalently according to the invention, for example, as is described herein.

In the illustration of FIG. 1, the device 10 is positioned at an appropriate area or areas of the part for the purpose of indicating the relative temperature of the part or of several areas of the part simultaneously. For convenience, the device 10 may be in the form of a strip-like sheet of material that is adequately flexible, perhaps even elastic, so as to fit in close engagement with the various curves or other shape of the part 12. In being strip-like, the device 10 may be somewhat configured to be held in engagement with the part, e.g. by straps, fasteners, etc.

As a function of the temperature of the part with which particular portions of the device 10 are engaged, the device 10 will provide an optical response. The preferred optical response is one in which the device 10 will scatter light of corresponding respective colors. Hereinafter the invention is described as producing color response, although other responses may be provided consistent with the invention, such as transmission, absorption, scattering, etc. By viewing such colors a technician or other individual appropriately skilled to comprehend the same or an automatic color detector, colorimeter, etc. can determine or comprehend the information indicated. Such information readily can indicate the probability of a possible temperature or other problem or particular condition, and so on. For example, if the device 10 and part 12 were in a particular temperature range in which the device 10 provides color output, the color would indicate specific temperature of the part 12 where the device 10 is positioned. If two devices 10 were placed on the part 12 at different respective areas, then a comparison of the color(s) of those devices 10 (or parts of a single large device 10 which overlaps two (or more) areas of the part 12) may indicate that the areas are at the same or at different temperatures. One exemplary use of the device(s) 10 to monitor temperatures of plural areas is the checking to determine if there is uniform heating when a part is heat treated. Another exemplary use is to sense temperatures of respective parts of an engine to detect cooling system blockages, excess friction, etc.

As is seen in FIGS. 2, 3 and 4, the liquid crystal device 10 includes two liquid crystal layers 14, 16 for providing a color response with respect to temperature, the temperature ranges of color response of the layers 14, 16 being different. The device 10 also includes a distinguishing mechanism 18 for distinguishing the temperature range in which the device is operational. In a sense the distinguishing mechanism 18 distinguishes between plural events, such as occurrence of temperature conditions in the different respective temperature ranges. The device 10 further includes a support 20 for supporting the two liquid crystal layers 14, 16 and the distinguishing mechanism 18 for positioning with respect to at least part of a body 12.

Each liquid crystal layer 14, 16 is formed of a plurality of volumes 22 of liquid crystal material in a containment medium or binder 24. For example, the liquid crystal material is that known as cholesteric liquid crystal material. Preferably such cholesteric liquid crystal material is of the short pitch type in that the length of pitch is significantly shorter than the diameter of the volumes within which such liquid crystal material is contained, thus avoiding the possibility of structural distortion of the liquid crystal or of optical affects outside the prescribed operational temperature range of the liquid crystal material. Such cholesteric liquid crystal material is known to scatter incident white light at particular colors as a function of the temperature of the liquid crystal material within an operational temperature range; if the temperature is outside such range, the liquid crystal material will be substantially transparent. Moreover, the color of the scattered light will vary as the temperature varies between such minimum temperature up to a prescribed maximum temperature above which the liquid crystal material in a sense is saturated and becomes transparent.

Preferably the containment medium or binder 24 is transparent; and most preferably it is colorless. Therefore, the medium 24 preferably will not have any optical impact on the device 10. Indeed, when the liquid crystal material in a particular layer thereof, such as layer 14 or layer 16, or both such layers, is below or above the temperature range in which it produces scattering of colored light, both such liquid crystal material and containment medium, i.e., the entire layer formed of the combination thereof, will be substantially optically transparent and colorless.

Alternatively, the liquid crystal material or binder could be tinted to enhance certain colors or to help differentiate one layer from another. For example, if the first layer were clear (untinted) and the second layer were tinted yellow, such yellow tinting would enhance the yellow-green colors and would facilitate distinguishing between layers and, thus, temperature ranges.

Exemplary materials of which the containment medium or binder 24 may be made include polyvinylidine chloride, gelatin, gum arabic, acrylics, polyurethanes, and copolymers. Such binder material may be mixed with the liquid crystal material to form a slurry or dispersion; and the slurry or dispersion may be applied to a surface and allowed to harden to form plural capsule-like volumes or the like containing liquid crystal material. If the binder 24 has elastic characteristics, the device 10 may be elastic, as is elsewhere described herein, especially if the support 20 were elastic.

Exemplary techniques for encapsulating liquid crystal material in a containment medium or otherwise forming the volumes of liquid crystal material in a containment medium are described in the prior art. One example is presented in U.S. Pat. No. 4,435,047, the disclosure of which is incorporated by reference. Such techniques may be used in the present invention.

Two exemplary liquid crystal materials that are particularly useful according to the present invention for detecting the temperature of the breast area of a person are, as follows:

Liquid crystal material 1: A mixture of cholesteryl oleyl carbonate 37%, cholesteryl nonanoate 43%, cholesteryl propionate 1%, cholesteryl 2, 4, dichlorobenzoate 15%, and cholesteryl cinnamate 3%.

Liquid crystal material 2: A mixture of cholesteryl oleyl carbonate 34%, cholesteryl nonanoate 47%, cholesteryl 2, 4, dichlorobenzoate 15%, and cholesteryl cinnamate 4%.

Liquid crystal material 1 has a temperature range on the order of about 30 degrees C. to about 33 degrees C.; and liquid crystal material 2 has a temperature range on the order of about 34 degrees C. to about 37 degrees C.

Of course, other liquid crystal materials having the same or different ranges of temperature response may be used according to the invention.

Alternatively, the thermochromic material used in the invention may be at least one material selected from the group including chiral nematic liquid crystal material, smectic liquid crystal material, a dispersion of liquid crystal material, and raw liquid crystal material.

As is shown in FIG. 4, the device 10 also includes a black material, such as black paint or ink 26 between a protective coating layer 28 and the second liquid crystal layer 14. Such black layer is provided to serve as a reference color or non-color. If desired, the color of the layer 26 may be other than black, although black is preferred due to the ability to camouflage the distinguishing mechanism 18 when the two liquid crystal layers 14, 16 are transparent and colorless. The protective coating layer 28 may be black in which case the separate black layer 26 may be omitted; or other means may be provided to achieve the desired camouflage function mentioned. Also, the protective coating layer 28 may be applied directly to the surface of the liquid crystal layer 16 remote from the layer 14. The black layer 26 may alternatively be applied to the outside surface 30 of the protective coating layer 28 remote from the layer 16.

The outside surface 30 of the protective coating layer 28 preferably is of a material and finish to permit it to be placed into engagement with the body 12 to achieve a relatively good thermal transfer effectiveness. The protective coating layer 28 may be Mylar or other material, for example clear plastic or plastic-like material. The purpose for the layer 28 is to prevent damage to the surface of the liquid crystal layer 16. If such liquid crystal layer 16 has adequate strength characteristics and is adequately robust so as to resist damage from forces, scratching and otherwise, applied thereto, the protective coating layer 28 may be eliminated.

Exemplary material for the support 20 may be a sheet of Mylar material or the like that preferably has structural integrity while providing the desired degree of resilience so that the device 10 can fit and wrap closely to the surface of the body 12. If desired, the support 20 also may have a resiliency and/or elastic characteristic to achieve the functions mentioned herein.

The various materials used in the several portions of the invention, e.g. device 10, should be of types that are able to withstand without failure the expected temperatures to which subjected.

The thermochromic layers 14, 16 may be self-supporting and/or self-protective so as to eliminate the need for one or both of the support 20 and protective layer 28. If the layer 28 were eliminated, the black layer 26 or other camouflage type material could be applied as a back layer directly to the surface of thermochromic (liquid crystal) layer 16 remote from the layer 14.

It will be appreciated that in one embodiment of the invention liquid crystal material 1 (identified above) may be used in the first liquid crystal layer 14 of the device 10, and liquid crystal material 2 (identified above) may be used in the second liquid crystal layer 16 of the device 10. Therefore, below about 30 degrees C., both layers 14 and 16 will be transparent; and upon inspection of the device 10 from the support 20 side, the device 10 will appear black due to the black layer 26.

The distinguishing mechanism 18 may be a thin sheet of transparent plastic, sheet-like or film-like material 31 which has printed or otherwise formed thereon an appropriate pattern or indicium 32 (FIGS. 2 and 4) capable of being visibly discernible upon viewing. The example illustrated in FIG. 2 is a crossed lines pattern. Alternatively, the pattern of the distinguishing mechanism 18 may be applied directly to the surface of the first liquid crystal layer 14 by printing or other techniques, thus eliminating the need for a separate material for the distinguishing mechanism 18. For optimal results, desirably the color of the grid pattern 32 is the same as the color of the black layer 26 (or other color layer substituted for the black layer) to accomplish the desired camouflaging of the grid pattern 32 when both of the liquid crystal layers 14, 16 are transparent. Alternatively, the color of the grid pattern 32 may be other than the same as the layer 26.

The device 10 may be made, for example, as follows: The support 20 is provided with the first liquid crystal layer 14. The first liquid crystal layer 14 is formed by making a slurry or dispersion of the liquid crystal material and containment medium or binder; and the slurry or dispersion is spread onto the support 20, e.g., using a pulling technique known in the art. The distinguishing mechanism 18 is applied, e.g., by placing the sheet 31 onto the top of the first liquid crystal layer 14, preferably after the layer 14 has dried or cured. Thereafter, the second liquid crystal layer 16 is formed and is applied, e.g., in the same way that the first one was formed and applied to the support 20. Preferably after curing of the second liquid crystal layer 16, the protective coating layer or sheet 28 is applied. A tie coat may be used to hold one or more of the layers together, as is conventional. The black layer 26 may be applied to the second liquid crystal layer 16 before the protective coating 28 is applied or the black layer 26 may be applied to the outside surface 30 of the protective layer 28.

The above method may be carried out in reverse order. For example, a tie coat may be used to hold the liquid crystal layer 16 to the protective coating layer 28, e.g., in the form of a sheet of plastic material, such as Mylar; then the grid sheet 31 of the distinguishing mechanism 18 would be applied; then the liquid crystal layer 14 would be applied; and finally the support 20 may be applied. The black layer 26 would be applied to the appropriate surface of the protective coating 28 (or included therein, for example), as was mentioned above.

Operation Of The Device 10

Below the minimum temperature, e.g., 30 degrees C., of the device 10, both liquid crystal layers 14, 16 will be substantially optically transparent and colorless. The surface 30 may be placed in an area or in engagement with a part the temperature of which is to be sensed. Looking through the surface of the support 20 one would see black, namely primarily the black layer 26. The distinguishing grid pattern 32 preferably would be camouflaged by the black layer 26 and would not be seen or at least would be substantially invisible.

When the temperature of the device 10 (or portion(s) thereof) is in the operational temperature range of the first liquid crystal layer 14, e.g., between about 30 degrees C. and about 33 degrees C., in response to incident white light the first liquid crystal layer (or corresponding portion(s) thereof) will scatter colored light; the particular color being a function of the actual temperature of the liquid crystal material, e.g., liquid crystal material 1 mentioned above. Also, the grid pattern 32 will not be visible because the colored first liquid crystal layer 14 will block the grid pattern from being viewed. Thus, the grid pattern 32, say of black color, will not be visible or viewable against the color of the liquid crystal material of the first liquid crystal layer 14. While the temperature of the device 10 is in the operational temperature range of the first liquid crystal layer 14 but has not yet reached the minimum temperature of the operational temperature range of the second liquid crystal layer 16, the latter will remain substantially transparent and colorless.

When the temperature of the device 10 (or portion(s) thereof) is in the operational temperature range of the second liquid crystal layer 16, e.g., between about 34 degrees C. and about 37 degrees C., then preferably the first liquid crystal layer 14 is beyond its operational range and is transparent (colorless) and the second liquid crystal layer 16 in response to incident white light will scatter colored light. The precise color will be a function of the actual temperature of the device, more precisely, of the liquid crystal material in the second liquid crystal layer 16, say liquid crystal material 2 mentioned above. The primary contribution to scattered light, then, is from the second liquid crystal layer 16. Since the grid pattern 32 is below the second liquid crystal layer 16, i.e., between liquid crystal layers 14 and 16, such grid pattern 32 will be seen against the colored background of the second liquid crystal layer 16. Although the first liquid crystal layer 14 preferably is colorless when the second liquid crystal layer is in its operative color light scattering temperature range and mode, it is possible that there could be some overlap of such ranges in which case the color of the device 10 will be a function of light scattered by both liquid crystal layers 14, 16.

From the foregoing it will be appreciated that the device 10 is capable of indicating temperature over a relatively broad range, in any event a range that is broader than the individual range of each of the liquid crystal materials used, while the precision of indication of the liquid crystal materials used is retained. The grid 32 of the distinguishing means 18 distinguishes between the two operational temperature ranges or events; and the color is an indication of the actual temperature within a particular range.

Turning, now, to FIGS. 5 and 6, a device 50 according to an alternate embodiment of the invention is illustrated. The device 50 is generally like the device 10 described above in having first and second liquid crystal layers 52, 54, a support 56, a black layer 58, and a protective coating 60. In this embodiment the black layer 58 is on the outside surface of support layer 56, which then preferably is transparent. Alternatively the black layer 58 may be on the inside surface of the support 56, i.e., between layers 52 and 56. A distinguishing means 62 is provided the device 50 in the form of a patterning of the second liquid crystal layer 54 and no patterning of the first liquid crystal layer 52. (It will be appreciated that, although less preferred, the first liquid crystal layer may be patterned and the second not; and, if desired, both may be patterned; all within the spirit and scope of the present invention.) For convenience it will be understood that the liquid crystal layers 52, 54 are comprised of the same materials as the layers 14, 16 described above, although it will be appreciated that other materials may be used.

In the device 50 the second liquid crystal layer 54 is patterned as a plurality of circular deposits 64 of the encapsulated liquid crystal material volumes. It is possible that the pattern may be other than such circular deposits, such as a linear pattern, one or more respective side(s) of a particular figure, such as a rectangle, and so on. The second liquid crystal layer 54 may be deposited in a manner to overlie the first liquid crystal layer 52, which preferably is plain or continuous and not in a particular pattern. The intermediate areas 66 between respective such circular deposits 64 may be filled by material of which the protective coating 60 is formed or even may be filled by raised portions or depths of the first liquid crystal layer 52. Alternatively, a material that takes up space in the intermediate areas 66 may be used there, such as a transparent binder material without any liquid crystal material therein.

The device 50 may be made in substantially the same way as was described above with respect to the device 10. However, in the device 50 the second liquid crystal layer 54 is applied in a patterned arrangement, e.g., as is shown. As was mentioned above, too, the thermochromic layers 52, 54 may be of materials other than liquid crystal and also may be self-supporting and/or self-protective so as to eliminate the need for one or both of support 56 and protective coating 60.

Operation Of The Device 50

With the support 56 and black layer 58 placed against a part 12, for example, after temperature stabilization of the device 50, below the minimum temperature, e.g., 30 degrees C., of the device 50, both liquid crystal layers 52, 54, will be substantially optically transparent and colorless. Looking through the surface of the protective coating layer 60 one would see black, namely primarily the black layer 58. The circular pattern of the second liquid crystal layer 54 would not be seen due to its transparency. Only black of layer 58 would be seen.

When the temperature of the device 50 is in the temperature range of the first liquid crystal layer 52, e.g., between about 30 degrees C. and about 33 degrees C., in response to incident white light the first liquid crystal layer will scatter colored light; the particular color being a function of the actual temperature of the liquid crystal material, e.g., liquid crystal material 1 mentioned above. Also, the colors will appear continuous, as the circular pattern of the circular deposits 64 and the other portions of the second liquid crystal layer 54 then would be substantially transparent and colorless.

When the temperature of the device 50 is in the temperature range of the second liquid crystal layer 54, e.g., between about 34 degrees C. and about 37 degrees C., then the first liquid crystal layer 52 becomes transparent (colorless) and the second liquid crystal layer 54 in response to incident white light will scatter colored light. The precise color will be a function of the actual temperature of the device, more precisely, of the liquid crystal material in the second liquid crystal layer 54, say liquid crystal material 2 mentioned above. The primary contribution to scattered light, then, is from the second liquid crystal layer 54; and since it preferably is placed in circular areas 64, the impact of the second liquid crystal layer 54 will be seen as plural circular color areas.

From the foregoing it will be appreciated that the device 50 is capable of indicating temperature over a relatively broad range, in any event a range that is broader than the individual range of each of the liquid crystal materials used, while the precision of indication of the liquid crystal materials used is retained. The circular deposits or patterns 64 establish a distinguishing means for the device 50 to distinguish between the two temperature ranges or events; and the color is an indication of the actual temperature within a particular range.

It will be appreciated that the invention is described with respect to FIGS. 2-6 above with reference to only two temperature ranges, two thermochromic (liquid crystal) layers and one distinguishing means; however, as is exemplified in further embodiments hereof, the number of ranges, layers and distinguishing means can be increased within the spirit and scope of the present invention.

Referring, now, to FIGS. 7-10, a device 70, according to still another embodiment of the invention, is illustrated. The device 70 includes three liquid crystal layers 72, 74, 76, each of the type described above; a support 78 and a black layer 80; and a protective coating 82, as above. The layer 72 is formed of a plurality of volumes of encapsulated liquid crystal material, e.g., in a continuous layer applied as above. The liquid crystal layer 74 is formed of a plurality of deposits of encapsulated liquid crystal material in a diagonal line pattern 84 with a positive slope (based on an imaginary Cartesian coordinate system, not shown). The layer 76 is formed of a plurality of deposits of encapsulated liquid crystal material as above; but the deposits are in a diagonal line pattern 86 of negative slope relative to the line pattern 84. Moreover, preferably the respective lines 84, 86 are positioned in overlying relation to cross at the intermediate part thereof, as is illustrated in FIG. 10, for example. The intermediate areas 88 of respective layers 74, 76 where there are no diagonal lines may be filled by binder material without liquid crystal material therein or by some other material which is preferably transparent; alternatively, the material of which the first liquid crystal layer 72 is formed may be placed in such intermediate areas 88.

If desired, one or more of the liquid crystal layers in this and in the other embodiments may be applied by a silk-screening process. The lines in the particular screen could provide the desired pattern and then would eliminate the need to print a separate pattern between layers.

The temperature range for each of the liquid crystal layers 72, 74, 76 preferably is different and exclusive or may be different and partly overlapping. In the operative example below preferably the temperature range of the first liquid crystal layer 72 is the lowest, that of the second liquid crystal layer 74 is intermediate, and that of the third liquid crystal layer 76 is highest; and the ranges are such that the second and third partly overlap. Other relationships of temperature range also may be used.

Operation Of The Device 70

With the device 70 placed against the part 12, for example, as was described above with support 78 against the part, when the temperature of the device 70 is below all of the three temperature ranges, only black will be seen, as all layers 72, 74, 76 are transparent. When the first temperature range is encountered, solid color of layer 72 will be visible while layers 74 and 76 remain transparent. When the second temperature range is encountered, the positive slope lines will be seen and they will be colored according to the temperature thereof either against the black background 80 or against a color background provided by the layer 72 if the temperature is still in the color light scattering temperature range of layer 72. When the third temperature range is reached, the negative slope lines will be visible either against the black background 80 or against a color background provided by the layer 72 if the temperature is still in the color light scattering temperature range of layer 72; and if the temperature still is within the second temperature range, an observer would see a cross-like or X-like pattern 90 (FIG. 10). The actual temperature would be a function of the color of either the negative or positive sloping line portions. Therefore, viewing an X-like pattern would indicate that an intermediate temperature range between the top of the second and bottom of the third temperature ranges was reached.

The cooperative interaction of the lines of the layers 74, 76 provides a distinction between two temperature ranges; and the elimination of such lines or crosses while color still is provided by layer 72 indicates that the first temperature range exists. Of course, if the temperature ranges were mutually exclusive, then only the solid color or the positive or negative sloping lines of the respective liquid crystal layers 72, 74, 76 would be seen as a function of temperature.

Referring to FIGS. 11-14, a device 110 according to still another embodiment of the invention is illustrated. The device 110 includes three liquid crystal layers 112, 114, 116; two distinguishing means 118, 120 in the form of respective lines of form a pattern, generally as was described above with respect to FIGS. 2-4; a support layer 122 and a black layer 124; and a protective coating or layer 126. The liquid crystal layers have three different mutually exclusive temperature ranges, as was described above; and preferably the first liquid crystal layer 112 has the lowest temperature range, the layer 114 the next higher, and the layer 116 the highest.

The distinguishing means 118, 120 preferably are in the form of sets of parallel lines 128, 130 arranged respectively orthogonally to each other. Such distinguishing means may be arranged in another cooperative pattern, such as the crossed pattern mentioned above with respect to FIGS. 7-10 or some other pattern so that a user may determine therefrom the particular temperature range being monitored and indicated by the device 110. For this example, the distinguishing means are sets of parallel lines, as is illustrated; such lines being formed on separate film-like or sheet-like materials placed between respective liquid crystal layers or by direct application, e.g., by printing, directly onto liquid crystal layers.

Operation Of The Device 110

In operation of the device 110, when the temperature thereof is below the minimum temperature for all liquid crystal layers 112, 114, 116, the device will appear black from the viewing side 132 due to the camouflaging effect of the black layer 124. If the temperature is within the first temperature range, then neither of the lines of the distinguishing means will be seen (or their appearance will be diminished), yet a color output will be produced by the first liquid crystal layer 112 as a function of temperature in the first range. If the temperature increases to the second temperature range, then only the straight lines 128 of the first distinguishing means 118 will be seen against the colored background of the second liquid crystal layer 114, the color of which represents temperature thereof within the second temperature range; the lines 130 of the second distinguishing means 120 would be blocked from view by the colored second liquid crystal layer 114. If the temperature is in the third temperature range of the layer 116, then a crossed grid pattern will be seen (FIG. 14) due to the fact that the lines of both distinguishing means 118, 120 are viewable against the colored background of the third liquid crystal layer 116. If the third temperature range is exceeded, black is seen again due to the transparency of the layers 112, 114, 116.

It will be understood that the present invention may be used to achieve temperature monitoring and indicating over a plurality of temperature ranges using plural event devices, i.e., each event being the "turn on to produce a color output" by respective liquid crystal materials and layers or the like including the same.

Although a number of different features and embodiments are illustrated and described herein, it will be appreciated and is intended that various of such features illustrated and described with respect to one embodiment may be used in one or more other embodiments.

STATEMENT OF INDUSTRIAL APPLICATION

According to the method of using the several devices 10, 50, 70, 110, and so on according to the invention, the temperature of a part 12, or other device, environment, etc., can be measured. Such measurement can be accomplished by applying in thermal transfer relation with respect to such part, device, environment, etc. a liquid crystal device of the type described having plural liquid crystal means for providing respective color responses as a function of temperature, the temperature ranges of color response of said at least two liquid crystal means being different, and distinguishing the temperature range in which the device is operational by viewing means positioned relative to said liquid crystal means and partly viewable depending on the temperature range of such liquid crystal means.

The embodiments of the invention in which an exclusive property or privilege is claimed are defined, as follows:

1. A liquid crystal device comprising at least two thermochromic means for providing an optical response with respect to temperature, at least part of a plurality of said thermochromic means being positioned in overlying relationship, and wherein the temperature ranges of optical response of said at least two thermochromic means being different, and distinguishing means for distinguishing the temperature range in which the device is operational, said distinguishing means comprising a patterned arrangement of at least one of said thermochromic means.

2. A liquid crystal device comprising at least two thermochromic means for providing an optical response with respect to temperature, at least part of a plurality of said thermochromic means being positioned in overlying relationship, and wherein the temperature ranges of optical response of said at least two thermochromic means being different, and distinguishing means for distinguishing the temperature range in which the device is operational, said distinguishing means comprising a patterned arrangement of indicia that are selectively viewable as a function of the optical response of respective thermochromic means.

3. The device of claims 1 or 2, each of said thermochromic means comprising liquid crystal material.

4. The device of claims 1 or 2, said at least two thermochromic means comprising at least three thermochromic means.

5. The device of claims 1 or 2, wherein said device further includes means for mounting relative to an object so that such device is operative to detect plural temperature ranges over different respective areas of the object.

6. The device of claim 5, wherein said at least two thermochromic means are chosen to be optically responsive over a temperature range encompassing the normal operating temperature of such object.

7. The device of claim 5, wherein said device is operational to visually display thermal gradients over areas of such object.

8. A device for providing an optical response indicative of the temperature of an object, comprising:
first and second thermochromic layers having different optically responsive temperature ranges and being superimposed over one another and located proximate such object; wherein said layers are optically cooperative to form different respective visual images over different temperature ranges.

9. The device of claim 8, wherein said first layer is optically transparent over a substantial portion of the optically responsive temperature range of said second layer.

10. The device of claim 9, wherein first and second layers each forms a sloping image over their respective optically responsive temperature ranges.

11. The device of claim 10, wherein such sloping image formed by said first layer has a slope different from such sloping image formed by said second layer.

12. The device of claim 11, wherein such images formed by said first and second layers overlap and form a crossing pattern when the temperature of such object lies within the optically responsive temperature ranges of both of said first and second layers.

13. The device of claim 9, wherein said second layer forms plural circular areas of scattered light over its optically responsive temperature range.

14. The device of claim 8, wherein such object is an engine and said first and second thermochromic layers include thermochromic materials which are optically responsive over respective temperature ranges such that the visual images formed are representative of different temperature ranges of the engine so as to indicate whether the engine is operating within a normal temperature range, below the normal temperature range, or above the normal temperature range.

* * * * *